United States Patent [19]

Lapourtre et al.

[11] Patent Number: 5,136,708
[45] Date of Patent: Aug. 4, 1992

[54] DISTRIBUTED OFFICE AUTOMATION SYSTEM WITH SPECIFIC TASK ASSIGNMENT AMONG WORKSTATIONS

[75] Inventors: Charles Lapourtre, Heeze; Gerard H. Rolf, Winssen, both of Netherlands

[73] Assignee: Oce-Nederland B.V., Venlo, Netherlands

[21] Appl. No.: 503,536

[22] Filed: Apr. 3, 1990

Related U.S. Application Data

[63] Continuation-in-part of Ser. No. 203,744, Jun. 7, 1988, abandoned.

[30] Foreign Application Priority Data

Jun. 9, 1987 [NL] Netherlands ............. 8701330

[51] Int. Cl.$^5$ ............................................. G06F 15/16
[52] U.S. Cl. .................. 395/650; 364/DIG. 1; 364/228.3; 364/229.1; 364/229.2; 364/230.3; 364/280.6; 364/281; 364/281.3; 364/281.8
[58] Field of Search ... 364/200 MS File, 900 MS File, 364/200, 900

[56] References Cited

U.S. PATENT DOCUMENTS

| | | | |
|---|---|---|---|
| 4,318,173 | 3/1982 | Freedman et al. | 364/200 |
| 4,333,144 | 6/1982 | Whiteside et al. | 364/200 |
| 4,413,318 | 11/1983 | Herrington | 364/200 |
| 4,423,414 | 12/1983 | Bryant et al. | 340/825.07 |
| 4,430,699 | 2/1984 | Segarra et al. | 364/200 |
| 4,466,063 | 8/1984 | Segarra et al. | 364/200 |
| 4,530,051 | 7/1985 | Johnson et al. | 364/200 |
| 4,649,473 | 3/1987 | Hammer et al. | 364/200 |
| 4,694,396 | 9/1987 | Weisshaar et al. | 364/200 |
| 4,754,395 | 6/1988 | Weisshaar et al. | 364/200 |
| 4,780,821 | 10/1988 | Crossley | 364/200 |
| 4,805,107 | 2/1989 | Kieckhafer et al. | 364/200 |
| 4,835,673 | 5/1989 | Rushby et al. | 364/200 |
| 4,839,798 | 6/1989 | Eguchi et al. | 364/200 |
| 4,849,877 | 7/1989 | Bishop et al. | 364/200 |
| 4,851,988 | 7/1989 | Trottier et al. | 364/200 |
| 4,901,231 | 2/1990 | Bishop et al. | 364/200 |
| 4,914,570 | 4/1990 | Peacock | 364/200 |
| 4,914,583 | 4/1990 | Weisshaar et al. | 364/200 |
| 4,937,784 | 6/1990 | Masai et al. | 364/900 |
| 4,941,084 | 7/1990 | Terada et al. | 364/200 |
| 4,954,945 | 9/1990 | Inoue | 364/200 |
| 5,031,089 | 7/1991 | Liu et al. | 364/200 |

FOREIGN PATENT DOCUMENTS

2069734A 8/1981 United Kingdom .

OTHER PUBLICATIONS

Escherle, A., et al., "The P3000 Office Computer System," *Philips Telecommunication Review*, vol. 42, No. 4, pp. 214–228 (1984).

Schantz, R. et al., *The Architecture of the Cronus Distributed Operating System*, 6th International Conference on Distributed Computing Systems, IEEE, pp. 250–259 (May 19–23, 1986).

Daniels, D. et al., *Real-Time Performance of a Completely Distributed Operating System*, Proceedings Real–Time Systems Symposium, IEEE, pp. 157–163 (Dec. 2–4, 1986).

Hull, R., et al., *Virtual Resource Ring: Technique for Decentralized Resource Management in Fault-Tolerant Distributed Computer Systems*, IEE Proceedings, vol. 131, Pt. E, No. 2 (Mar. 1984).

*Primary Examiner*—Gareth D. Shaw
*Assistant Examiner*—Matthew C. Fagan
*Attorney, Agent, or Firm*—Reed Smith Shaw & McClay

[57] ABSTRACT

A distributed office automation system includes workstations and support stations which are interconnected via a network and which make use of the functionality of one another by subcontracting tasks. Various function modules are available in the system for numerous tasks and the system provides a distributed organization structure in which it is always clear what function module is required to perform a specifc task. Each of the stations is provided with a coordination unit which is continually aware of the state of the total system and which designates the required function module.

5 Claims, 6 Drawing Sheets

DISTRIBUTED OFFICE AUTOMATION SYSTEM WITH SPECIFIC TASK ASSIGNMENT AMONG WORKSTATIONS

PRIOR APPLICATION

This is a continuation-in-part application of Ser. No. 07/203,744 filed Jun. 7, 1988, now abandoned.

FIELD OF INVENTION

The present invention relates to a distributed office automation system, comprising intelligent units interconnected by a local network and each provided with a processing unit and a memory, which memory contains program modules suitable for performing a task, in which system a unit can have tasks performed by a module in any of the units containing that module.

BACKGROUND OF THE INVENTION

Distributed computing systems are generally well known. See, for example, 6th International Conference on Distributed Computing systems, IEEE (May 19–23, 1986) pp. 250–259; Proceedings Real-Time Systems, IEEE (Dec. 2–4, pp. 157–163; R. Hull, et al., *Virtual Resource Ring: Technique for decentralized resource management in Fault-tolerant Distributed Computer Systems.* IEEE Proc. 131 Pt. E No. 2 (Mar. 1986) and U.K. Application 2069734A.

U.S. Pat. No. 4,530,051 discloses an organizational scheme for a distributed multiprocessor system in which tasks may be executed by program modules v in different processing units. It does, however, not disclose the way a unit locates the program modules concerned.

Also of interest is the "P3000 office computer system" 1 Philips Telecommunication Review, Vol. 42, No. 4, 1984, pages 214–228. This system comprises various kinds of units, such as workstations and support stations.

Workstations are provided with a keyboard, a display screen and a processing unit having one or more microprocessors. Support stations are intended to perform a number of specialized tasks for the workstations, e.g., providing communication with other units, a printer and mass memories, for which purpose they also have their own intelligence.

The units are interconnected by means of a data network. In this way they can exchange data and make joint use of specialized equipment.

A specific office activity can be regarded as a collection of sub-tasks required to be performed. To this end, a unit has available a number of modules which perform the sub-tasks. These modules are in fact programs which are performed by the central microprocessor in the unit. Not every task or sub-task can be performed in each unit. When it is required to perform a task of this kind, the unit can search for a connection to another unit and instruct that unit to perform the required task.

The organization of this is controlled by the known office automation system itself. As far as the workstation operator is concerned, it is often not relevant to know where an order given by him is performed, provided such order is performed. To this end the units are provided with a list of all the modules present in the system with their address, which is the place in the system where the module is located.

When performance of a specific task is required, the unit searches for the associated module in its list and establishes connection therewith in accordance with the data in that list.

In this connection, problems may arise if one or more modules in the system become inoperative; for example, because the unit in which they are running malfunctions. Problems may also arise if extra modules become available, for example, as a result of an extra unit being connected to the system.

There is, therefore, a need for a mechanism which always keeps the lists of the units completely up to date, so that the system retains maximum functionality even in the event of a malfunction in one or more of the units, and, in principle can be expanded at any time by connecting extra units. As a result of such connection, however, it is possible that more than one module intended for a specific task to occur within the system. For such cases there must be a clear selection mechanism which designates one of the identical modules.

A selection mechanism for identical modules in a distributed system is disclosed in U.S. Pat. Nos. 4,466,063 and 4,430,699. The system disclosed in these patents comprises Local Systems (LS), connected to a network, each of which is provided with a Systems Interconnection Processor (SIP). An LS wanting to subcontract a task to a resource in another LS, sends a service request to its SIP. The SIP does not have a list of all resources available in the entire system, although it has one of the resources available in its own LS, and broadcasts the service request to all other LSs.

On reception of that broadcast message, the SIPs of all LSs check whether they have available the requested resource and, if so, whether the requesting LS is authorized to use it. In the affirmative, an SIP checks whether the requested resource is free to handle the service request and, if so, broadcasts an "accept" message, whereafter the requesting SIP transmits the task to the accepting SIP, which transfers the task to its LS for execution. In case the requested resource is busy, the SIP waits until it is free again and then broadcasts its "accept" message.

"Accept" broadcast messages arriving after the first one (or after the Nth one, if N resources have been asked for in the service request) are discarded and are, in fact, not transmitted from the moment a SIP that is ready to accept receives the first "accept" broadcast message from another SIP.

In order to prevent heavily loaded LSs from being selected, which would still increase their loading, the SIPs delay their "accept" messages proportionally to the loading, so that less loaded LSs will respond first and be selected.

In case of abnormal behavior of an SIP, the other SIPs, detecting errors in the messages of that SIP, ignore further messages from that SIP until they receive a normal message from that SIP again.

In this system, the selection of a resource is an entirely autonomous process formed by the interaction between the SIPs. The SIPs have no way of selecting a particular resource themselves, as a SIP does not have any information on the system (except for information on the SIPs not functioning properly) outside its own LS. Furthermore, if for economical or organizational reasons a specific task should be performed by one and the same resource in the entire system, even if there are several identical resources available (the other resources merely being reserves) the system disclosed does not provide an appropriate selection mechanism.

Accordingly, it is an object of the invention to provide an office automation system which is easy to expand and in which local malfunctions do not affect the operation of the complete system or result only in a slight degradation of performance.

SUMMARY OF THE INVENTION

According to the invention this objective is attained in a distributed office automation system by providing each unit with a control program module for designating, for each task, the module required to perform that task, hereinafter referred to as a "coordinator", which maintains the list in the memory of that unit,
which is provided with means for determining the loading of that unit,
which is connected to the coordinators in all other units and constantly transmits thereto data concerning the loading of that unit and the content of the list in that unit.

The list contains selection data for all the written-in modules, which enables the coordinator to designate a specific module when identical modules are available in the system. As a result, any changes in the system resulting from the failure or addition of modules are organizationally intercepted so that the resulting system is relatively insensitive to malfunctions and can readily be expanded.

Another advantage of the invention is that the choice of a module is determined distinctly, i.e., each coordinator designates the same module at any specific time even if there are identical modules available in the system.

In one embodiment of the invention the selection data for identical modules for specific first tasks stipulates that the task-identical module in the least loaded unit must be selected, and the selection data for identical modules for specific second tasks involve a predetermined priority sequence. The criterion for the choice of a module is thus determined by the nature of the task. Some tasks are required to be performed by a specific module for the entire system, even if there are several identical modules available. Only when that specific module breaks down, e.g., because of malfunction, can another—identical—module be designated. This designation will be effected on the basis of a predetermined priority sequence forming part of the selection data.

In the case of tasks which are not restricted to performance by a specific module, the selection criterion between identical modules is the loading of the units in which the associated modules are located. As a result, the response time of the system is kept short.

In a further embodiment of the invention, the modules themselves inform the coordinator of the unit in which they are situated of their availability and the selection data applicable to them. This can occur, for example, on the start up of the system or after a malfunction in a unit has been cleared. As a result of this reporting procedure, the coordinator includes the associated module in its list and transmits this change to the other coordinators in the system.

According to a still further embodiment of the invention, when the coordinators have not received the data from one or more other coordinators for a period longer than a predetermined time, they do not select the modules in the units in which the other coordinators are situated.

Consequently, the breakdown of a unit causes the minimum possible disturbance to the operation of the system. Tasks which were performed by modules in the malfunctioning unit are automatically transferred to modules in satisfactorily operating units. This may give rise to problems for a task which is performed by a specific module for the entire system, because the data required for that task are stored in the memory of the malfunctioning unit and therefore become inaccessible or even disappear.

Therefore, such a module is adapted to update data in the memory of the identical modules elsewhere in the system corresponding to the first mentioned data, when the latter are changed in connection with the performance of the task.

The advantage of this is that in the event of a malfunction of the active module the next module in the priority sequence can immediately take over the task of the malfunctioning module.

Other characteristics and advantages of the invention will be apparent from the following description of presently preferred embodiments taken in reference to the accompanying drawings. Like references denote like parts.

PRESENTLY PREFERRED EMBODIMENTS

The following embodiment relates to a distributed system of intelligent units running under UNIX BSD 4.2 operating systems and connected to an Ethernet local network.

Figure 1:
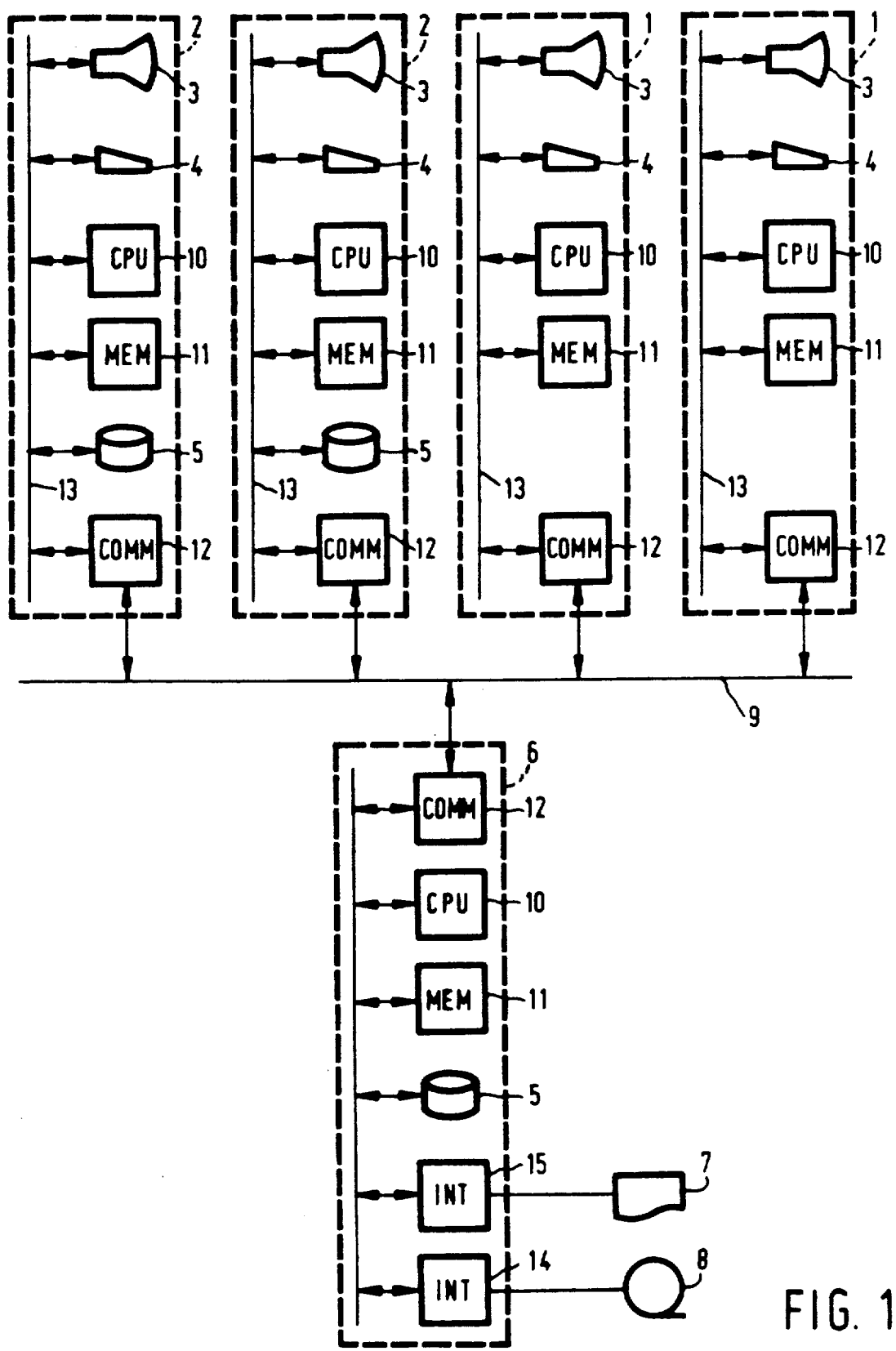
FIG. 1 is a diagrammatic drawing of an exemplified embodiment of a system according to the invention.

Referring to FIG. 1, the illustrative system comprises workstations 1 and 2, where office workers perform their tasks. Workstations 1 include a processing unit (CPU) 10, a memory 11, a display screen 3, a keyboard 4 and network interface 12, interconnected by an internal bus 13. Workstations 2 additionally have a mass memory 5 of their own (magnetic disk). As shown, the system also includes at least one support station 6 and peripheral equipment, such as a printer 7 or a mass memory 8. Support station 6 has a processing unit 10, a memory 11, a mass memory 5, a network interface 12 and interfaces 14, 15 to the peripherals 8 and 7 for controlling the latter.

Work stations 1 and 2 and support station 6 are interconnected by a local network 9 via their network interfaces 12. This network can also be used to connect peripherals 7 and 8 to support station 6, but this connection can also be established directly by a separate cable as shown in FIG. 1.

Each station 1, 2 or 6 has available program modules with which it can perform tasks. Support station 6 has program modules for controlling peripherals as well as performing a number of tasks normally performed by a workstation, e.g., in order to relieve the latter of a load.

In the UNIX environment, a running program module is called a process and several processes may be active simultaneously in a station. In performing its task a process may request assistance from another program module (process). The requesting process is called the "client" process and the process arranged for giving assistance is called the "server" process.

For such assistance, an appropriate server process must be found and a connection must then be established between the client and the server for exchanging data.

Under UNIX, processes have an identifier for addressing them, which also designates the machine in which they reside. This identifier will herein be called a "name". UNIX BSD provides standard Inter Process Communication services, using TCP/IP (Transmission Control Protocol/Internet Protocol) or UDP/IP (User Datagram Protocol/Internet Protocol). A connection between two processes is made using "sockets", i.e., virtual bidirectional communication terminals that may be allocated a name. A process having to communicate with an other process creates a socket and binds a name to it. Server processes wait for service requests, listening on their sockets. A client process in need of assistance "connects" its socket to the one of an appropriate server using the name of that server/socket and sends a message to it. The server receives the message, performs the task comprised in it and returns the result to the client in the same way.

In the system according to the invention, a control program is operative in each station 1, 2, 6, which is specifically adapted to coordinate the contacts between the processes. Each of the control programs, hereinafter called "coordinators", communicates with the other ones over the network 9 using UDP/IP protocol broadcast messages in order to find out the services offered on the other stations and the loading of the other stations. In addition, a coordinator communicates with processes in its own station to tell them to which station to send their requests for service. To be able to do this, a coordinator maintains the following data:

the loading of its own station's CPU.,
an "active" list of stations in the system with their CPU loading figures;
a local "service" list of services offered in its own station.
a system "service" list of services offered in the entire system.

These are described in detail below.

1. The loading of its own station.

Under UNIX BSD 4.2, data indicating the loading of a machine, averaged over 1, 5 and 15 minutes, are constantly calculated by the kernel. The coordinator uses the standard "w(1)" utility to find out these loading figures.

2. The "active" list.

At more or less regular time intervals, e.g., every 10 seconds, every coordinator transmits in UDP Broadcast packets its loading figures to the coordinators of the other stations in the system. A packet has the following form:

---
name of station sending
sort of packet: "active"
loading figure over 1 min.
loading figure over 5 min.
loading figure over 15 min.
s.p. counter

---

A station is identified by a name or identifier.

The "s.p. counter" field contains the current value of the "service" packet counter of the transmitting station. This value is used to check whether the "service" list of the receiving station is up-to-date with respect to the services offered by the transmitting station, as will be explained below.

The "active" list contains information on every station in the system. It has an entry for every station, which contains at least:

the name of the station;
whether the station is active;
the last time an "active" broadcast packet was received from the station;
the latest loading figures received from the station;
the most recently received value of the "service" packet counter of the station.

Each time a new "active" broadcast packet arrives, the coordinator updates the entry in its list of the station concerned as soon as possible. If the "service" packet counter value is not equal to the one stored in the list, the coordinator asks the sending coordinator to retransmit the last sent update of the "service" list. A more detailed discussion of the communication between coordinators is given below.

The coordinators maintain a constant watch on their "active" lists, to find out if all stations are still active. The time which may elapse between two consecutive broadcasts of a station is restricted to a maximum. If a station breaks down, then the broadcasts from its coordinator cease. The other coordinators note the absence of the broadcasts and wait for a predetermined time—which is, for instance, two times the maximum interval between two broadcasts—for—new broadcast. In the absence of the latter, they conclude that the station concerned is out of operation or at least inaccessible, and they change the entry of that station in their "active" lists accordingly. As a result, each coordinator knows which of the other stations are in operation and knows their loading.

3. The "service" lists.

The local "service" list contains information on all services offered (i.e.. server processes waiting for a service request) in the coordinator's station. For every server there is a separate entry, which contains at least:

the name of the server;
the category of the server and, if appropriate, the priority number.

(The category of the server is discussed below.)

The system "service" list contains information on all services offered anywhere in the system. An entry contains at least:

the name of the service;
the number of stations offering this service;
the names of the stations offering this service;
the category of the service and, if appropriate, the priority sequence;
the last time this entry was changed.

(The category of the service is discussed below.)

Every time a server process is activated or deactivated in the system, the coordinator of the station in which that process resides updates its local "service" list and broadcasts the updated list to the other coordinators, which then update their system "service" lists using the new information, as does the broadcasting coordinator itself. A broadcast packet for this purpose has the following form:

---
name of station sending
sort of packet: "service"
local "service" list of
station sending

---

-continued s.p. counter value

The s.p. ("service" packet) counter value is used to make sure that no service packet is lost during broadcast, as the UDP Broadcast does not guarantee that every packet is actually received by all stations. It is chosen randomly when the station is booted and is incremented by 1 immediately after a "service" packet has been broadcast. As the s.p. counter value is transmitted with every "active" packet, every coordinator knows the counter value of the next "service" packet. Immediately after reception of a "service" packet, every coordinator increments the s.p. counter Value for the transmitting station in its "active" list by 1 in order to be read for receiving the next "service" packet.

Coordinator Communication

Figure 3:
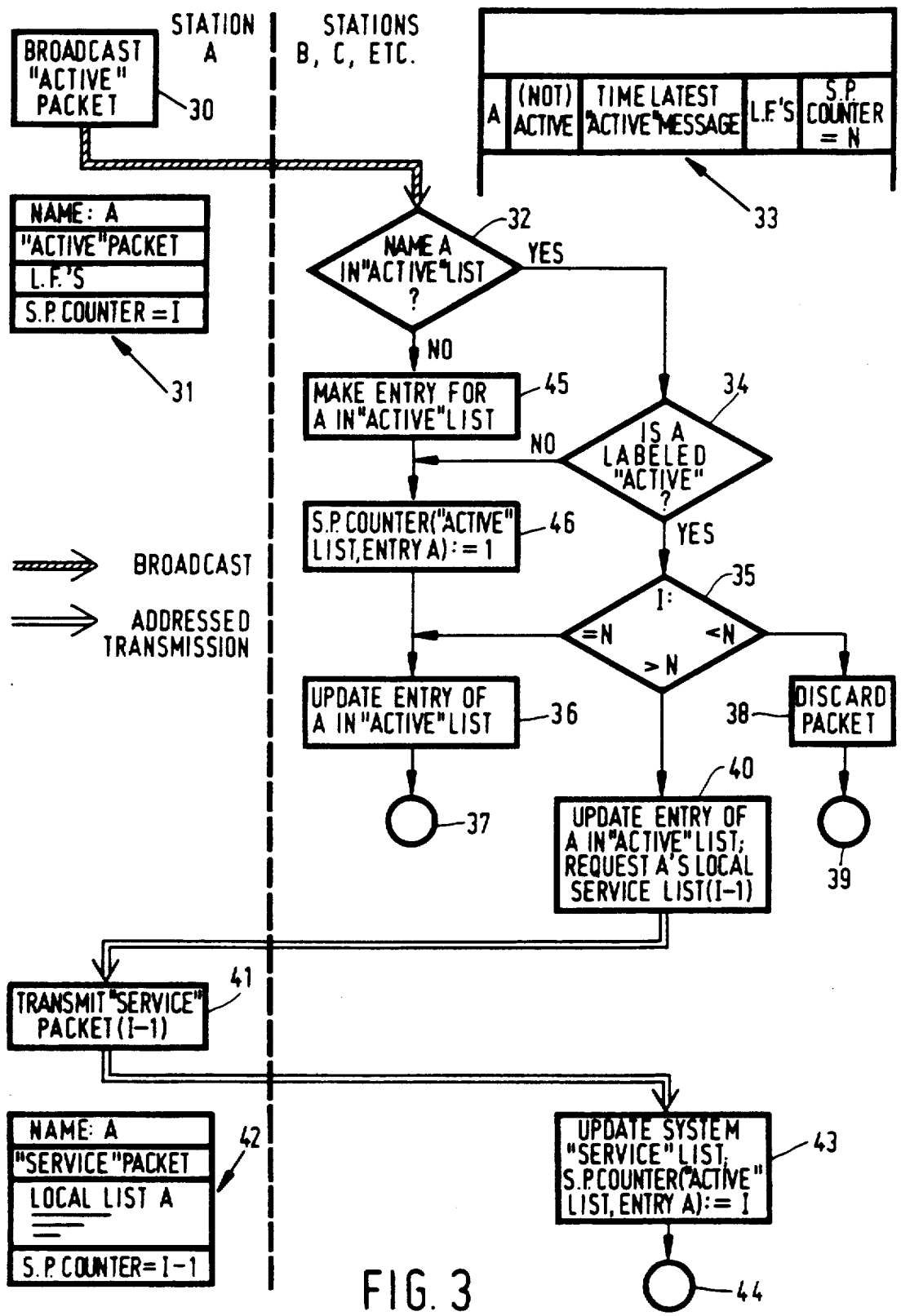
FIGS. 3, 4, and 5 show flow diagrams of the communication between the coordinators of the units in a system according to the invention.
Figure 4:
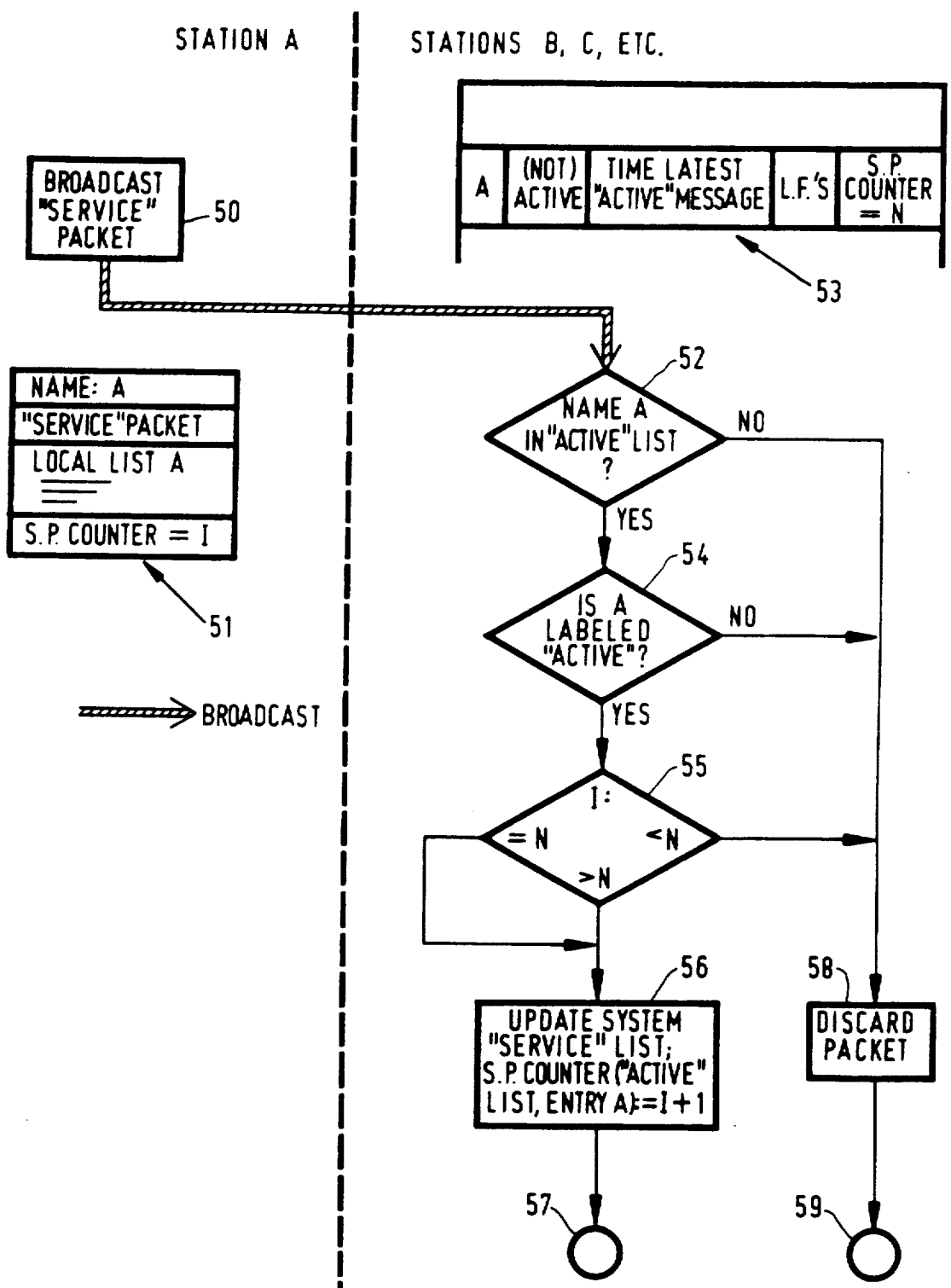
Figure 5:
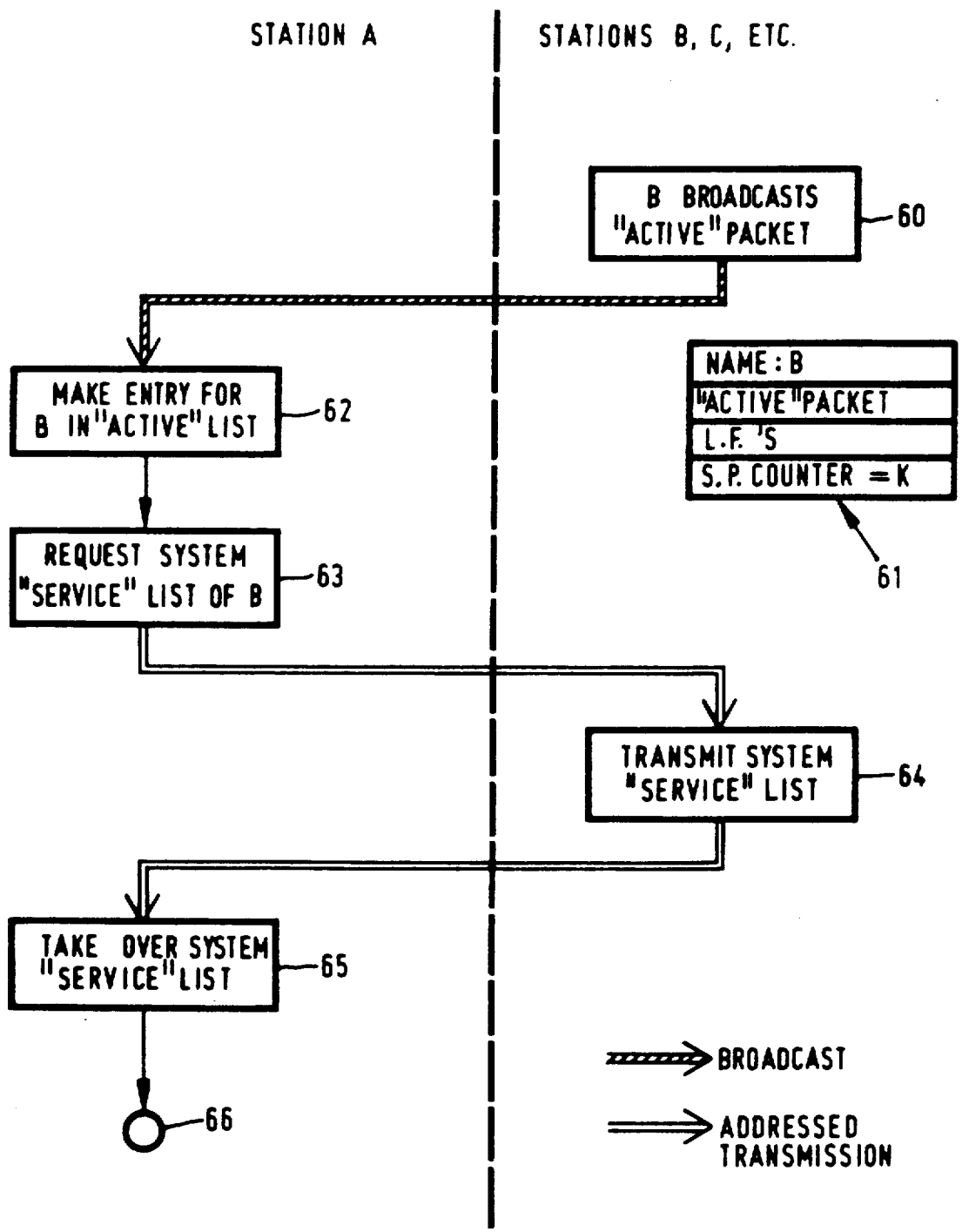

The communication between coordinators is shown in the flow sheets of FIGS. 3, 4 and 5. Actions of the coordinator of a station A (hereinafter referred to as "coordinator A") are shown at the left side of the vertical broken line and those of the coordinators of other stations B, C, etc. (hereinafter referred to as "coordinator B", "coordinator C", etc,) at the right side of that line. It is always assumed that stations B, C, etc. are running and are aware of each other's presence. Their reactions to actions of station A are identical, so only one sequence is shown at the right side. Therefore, if the actions of coordinator B are described, the same actions are performed by coordinators C, etc., but the latter have been omitted for reasons on clarity.

FIG. 3 shows the event sequence following an "active" broadcast of station A. Station A may be running and be known to the other stations or it may have just been introduced into the system and still be unknown to the other stations. Last, it may have just rebooted after a breakdown and be known to the other coordinators, but still labeled "inactive" in their "active" lists.

In all cases mentioned, coordinator A broadcasts an "active" packet 31 (step 30), which is received by coordinator B. The packet has an "s p. counter" field with the "service" packet counter value of the latest "service" packet broadcast by coordinator A. This value is called "I". Coordinator B checks step 32) if station A is in its "active" list 33, and, if so, if station A is labeled "active" (step 34). If station A is known as being active, coordinator B checks the s.p. counter value of the packet (I) against the value in its "active" list (N) (step 35).

If I N, as it should be under normal conditions, coordinator B proceeds to step 36 and updates the fields "time latest "active"message" and "If's" (loading figures) of the entry of station A in its "active" list, using the loading figures contained in the "active" packet and goes into a waiting state (37).

If I<N, indicating that the received packet is an old one that has probably been held up somewhere in the network coordinator B discards the message. as is not relevant any more, (step 38) and goes into a waiting state (39).

If I>N, indicating that "service" packet I−1 (or even more than one previous packet, when I−N>1) has not arrived, coordinator B requests coordinator A to transmit the last "service" packet and updates the entry of station A in its "active" list (step 40). Coordinator A transmits the specified packet (42) (step 41) and coordinator B updates its system "service" list with the data of the "service" packet, whereafter it writes the value I into the s.p. counter field of A's entry in its "active" list (step 43). Then it goes into a waiting state (44). The communication between the coordinators A and B described here is not by broadcast, but by an addressed transmission, which is more reliable and loads the communication process less. Also, the transmission of the "service" packet in step 41 does not change the s.p. counter value.

In the case of station A having just been introduced into the system, its name is not in the "active" list of coordinator B. The letter now makes a new entry in its "active" list to accommodate station A (step 45), and fills in the s.p. counter value (step 46) and the "active", the "time latest "active"message" and the lf's fields from the "active" packet received (step 36), after which it goes into a waiting state 37.

If station A has just rebooted after a breakdown, its name is still known to coordinator B, but it has been labeled "inactive" in B "active" list. At the reception of the "active" packet of coordinator A, coordinator B goes through steps 32 and 34 and then updates its "active" list entry for station A by filling in s.p. counter value "I" (step 46) and the "active", the "time latest "active"message" and the lf's fields according to the "active" packet received (step 36), after which it goes into a waiting state 37.

FIG. 4 shows the event sequence following a "service" broadcast of station A. Although a station will, after startup, always broadcast an "active" packet before it broadcasts "service" packets, it is always possible that the initial "active" packet has got held up or lost on the network and a "service" packet is the first to arrive. Therefore, there are three situations in which the "service" packet can arrive: 1) station A is running and known to the other stations, 2) station A has just been introduced into the system and is still unknown to the other stations, or 3) station A has just rebooted after a breakdown and is known to the other coordinators, but still labeled "inactive" in their "active" lists. In all casts it is assumed that the other stations are running and aware of each other's presence.

Coordinator A broadcasts a "service" packet 51 (step 50), which is received by coordinator B. The "s.p. counter" value of the packet is called "I". Coordinator B checks (step 52) is station A is in its "active" (step 54). If station A is known as being active, coordinator B checks the s.p. counter value of the packet (I) against the value in its "active" list (N) (step 55).

If I=N, as it should be under normal conditions, coordinator B proceeds to step 56 and updates its system "service" list using the data contained in the "service" packet. After this, coordinator B increments the s.p. counter value of A's entry in its "active" list by 1 and goes into a waiting state (57).

If I>N, indicating that "service" packet I−1 (or even more than one previous packet, when I−N>1) has not arrived, coordinator B assumes that the "service" packet just received is the most recent anyway and uses the data contained in it to update its system "service" list. Then coordinator B writes the s.p. counter value of the packet, incremented by 1, into the s.p. counter field of A's entry in its "active" list to prevent "service" packet I−1 from erasing the more recent information of packet I, would it arrive later.

If I<N, indicating that the received packet is an old one that has probably been held up somewhere in the network, coordinator B discards it, as is not relevant any more, (step 58) and goes into a waiting state (59).

In the case of station A having just been introduced into the system, its name is not in the "active" list of coordinator B. The latter simply discards the packet, as it programmed to accept "service" packets from known stations only, after which it goes into a waiting state (59).

If station A has just rebooted after a breakdown, its name is still known to coordinator B, but it has been labeled "inactive" in B's "active" list. At the reception of the "service" packet of coordinator A, coordinator B goes through steps 52 and 54 and then simply discards the packet as it programmed to accept "service" packets from active stations only, after which it goes into a waiting state (59).

FIG. 5 shows the event sequence, in the case station A has just been introduced into the system or station A has just rebooted after a breakdown, following an "active" broadcast of one of the running stations in the system. The "active" packet of coordinator B is assumed to be the first one to arrive after station A gets active. Upon the reception of this "active" packet, station A initializes as a system station and subsequently handles all broadcasts in the way described with respect to FIG. 3 and FIG. 4.

Coordinator B broadcasts an "active" packet (61) in step 60. Upon reception of this packet, coordinator A makes an entry for B in its "active" list, and fills it with the data contained in the packet (step 62). Then it transmits a request to coordinator B to transmit its system "service" list (step 63). Coordinator B does so (step 64) and coordinator A takes the list over as its own system "service" list (step 65), after which it goes into a waiting state (66).

CLIENT-SERVER COMMUNICATION

To make them suitable for use in the system described here, client and server program modules contain a set of library routines that can be activated by the following primitives:

the "connect" primitive: this primitive is used by a client process to obtain a communication link with a certain server. It first addresses the coordinator of the client's station, which returns the addressing information of that particular server. After the server is located, the "connect" primitive establishes a "symbolic" link (i.e.. one that is addressed by name) between the client and the server processes;

the "terminate" primitive: this primitive is used to remove the communication link between the client and server processes.

the "register" primitive: this primitive is used by a server process to make itself known to the coordinator of its station. When a server process is activated, it reports to its coordinator, using a preprogramed name and category. The coordinator responds by writing the reporting server in its local "service" list and broadcasts the updated list to the other coordinators. As a result, every coordinator updates its system "service" list correspondingly.

the "deregister" primitive: this primitive is used by a server process to communicate to its coordinator that it is no longer able to perform the task it is meant for. The coordinator then updates its local "service" list and broadcasts the latter to the other coordinators. As a result, every coordinator updates its system "service" list correspondingly.

In addition, every client process has functionality to detect when a connection with a server process is broken off, e.g. by a malfunction of the station in which that server resides, and to call the "connect" primitive in order to obtain a communication link with a replacing server, if any.

SERVER CATEGORY

Because the system comprises several more or less identical stations, there will certainly be a number of server processes with multiple instances in the system, i.e.. there will be identical servers available. Such servers have the same preprogramed name and belong to one of two categories, i.e.. "equivalent" or "substitute". The category is always transmitted to the coordinator by the "register" primitive.

An "equivalent" server is intended for a task not restricted to a specific station, e.g.. a text spelling check. Such a task can in principle be subcontracted to any station in the system and in case of failure of the station in which a particular server is performing such a task, the task may be performed once again by an identical server in another station.

A "substitute"server is intended for a task which must be performed by one and the same server process in the entire system, e.g.. the updating of the list with operators access passwords. If there is more than one server available for that task, they are counted as a reserve. In the event that the station which contains the server actually performing the task breaks down, one of the reserves should take over. To this end, these servers are given a priority number which defines a sequence for performing the task, e.g.. by preprogramming or by a suitable algorithm for allocating a priority number upon registering. The substitute server processes are always written in the "service" lists with their priority number.

In the case of substitute servers controlling a data file, such as the previously mentioned password collection, there is an extra precaution taken. In the event that the station containing the server actually performing the task breaks down, the data concerned should be kept accessible for the server process taking over. Therefore, all the identical server processes of this kind have their own data files in the memories of their stations, containing the same data, with the server actually performing the task maintaining all said files, either by broadcasting changes made to its own data file or by directly connecting to its substitutes and transmitting those changes.

When a client process requests a connection to a server, its coordinator scans its system "service" list to find out in which station or stations the concerned server is available and of what category it is. Next, the coordinator looks in the "active" list, if the station or stations offering the service are active and removes the stations indicated as inactive from the selection.

If there is only one server of the name specified in the request, the coordinator returns the addressing information the client process needs to communicate with that server.

If the specified server is of the "equivalent" category, the coordinator selects the server in the least loaded station. To this end the coordinator calculates a loading indication from the loading figures in its "active" list, e.g., using the formula loading indication = 1 × 1f(15) + 3 × 1f(5) + 15 × 1f(1)

(wherein 1f (i) = loading figure over i minutes). The aim of bringing in the longer term loading figures is to avoid oscillation in the loading of a particular station.

The coordinator compares the calculated loading indications of the active stations containing the specified server and selects the server in the station having the lowest loading. As the time intervals between two broadcasts of a station are rather long (e.g., every 10 seconds, in order not to increase the loading of the station too much), it may be preferable for the coordinator to ask the stations containing the server to send their actual loading figures first and make its selection on the basis of the new loading figures.

If the specified server is of the "substitute" category, the coordinator selects the server having the highest priority according to the priority sequence in the system "service" list.

An example of the operation of the coordinators will now be explained with reference to FIGS. 2a-2f.

Figure 2A:
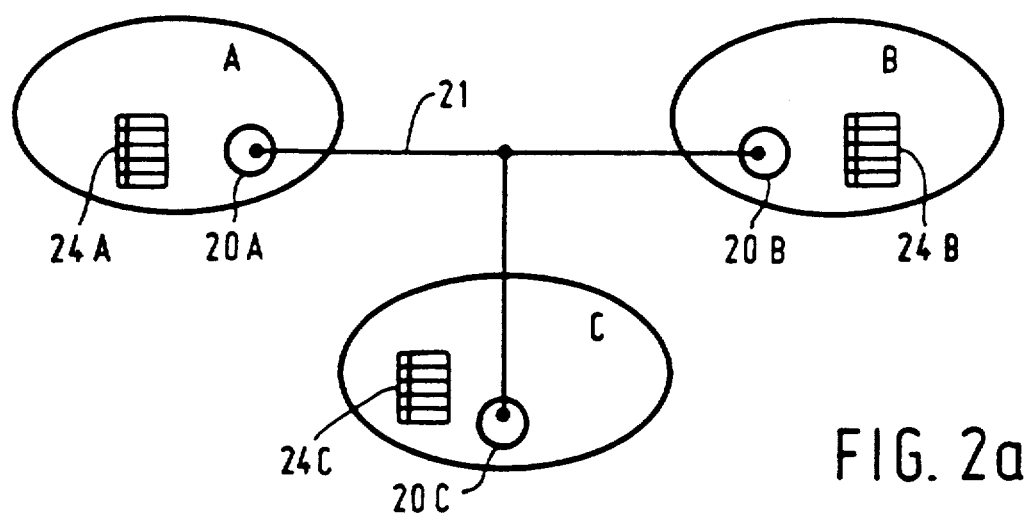
FIGS. 2a, 2b, 2c, 2d, 2e, and 2f are diagrammatic presentations of the operation of the system according to the invention.

FIG. 2a illustrates stations A, B and C, each provided with a coordinator 20A, 20B and 20C. The coordinators maintain mutual- contact via the connection 21. This connection is a "logic" connection via network 9 (FIG. 1). Each station is further provided with an "active" list (not shown), a local "service" list (not shown) and a system "service" list 24A, 24B, 24C.

Figure 2B:
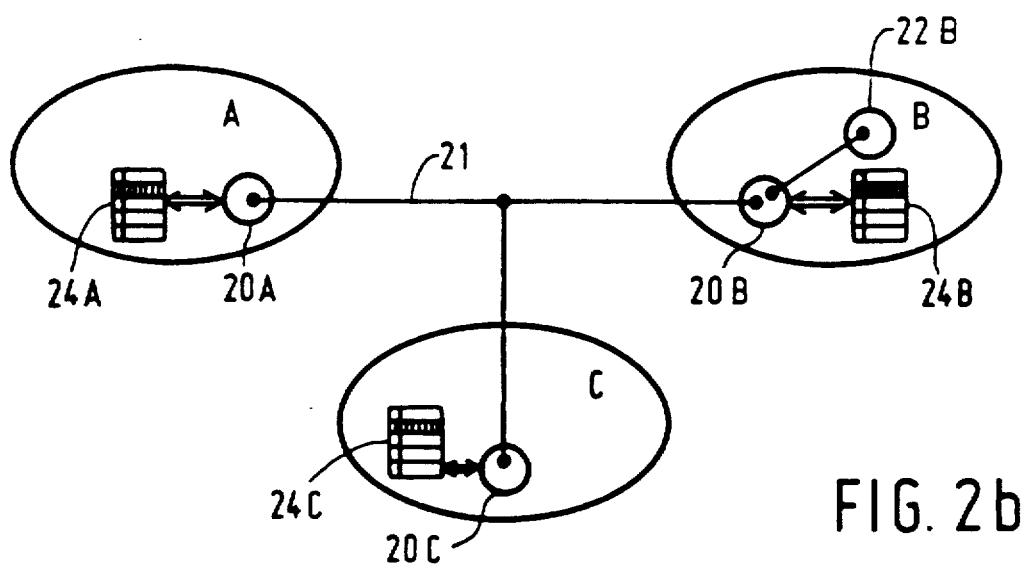

FIG. 2b illustrates a server process 22B which reports itself to its coordinator 20B and then is included local "service" list of that coordinator by name and category. In this example this server has the name TASK, belongs to the "substitute" category and has the priority number 1. The coordinator 20B writes in the server 22B in its system "service" list 24B and transmits the data immediately to the other coordinators 20A and 20C which also write in the server 22B in their system "service" 24C. The server now goes the standby position until there is work for it.

Figure 2C:
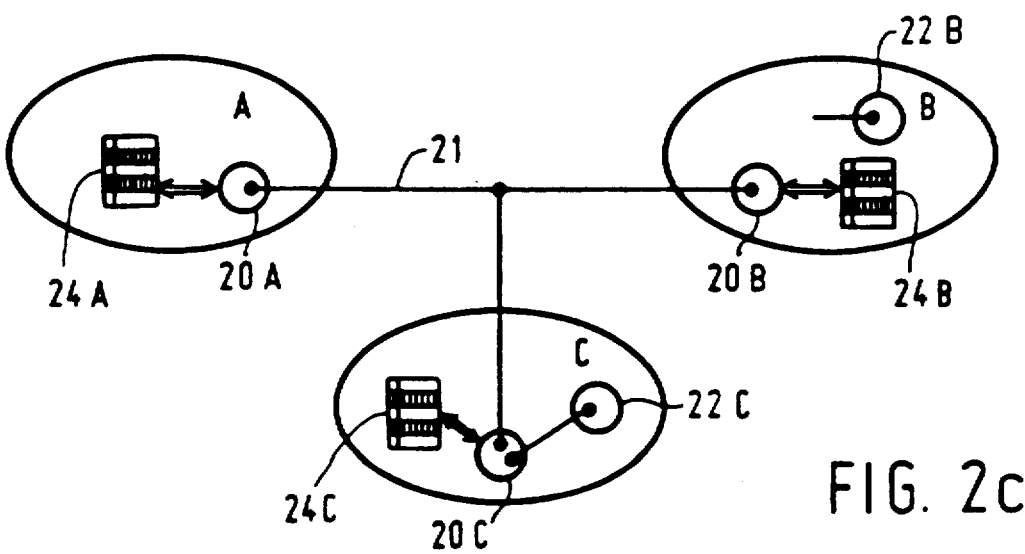

FIG. 2c illustrates a second server process 22C which becomes written in. This server is intended for the same task as server 22B and therefore has the same name TASK, and is also of the "substitute" category and has the priority number 2.

Figure 2D:
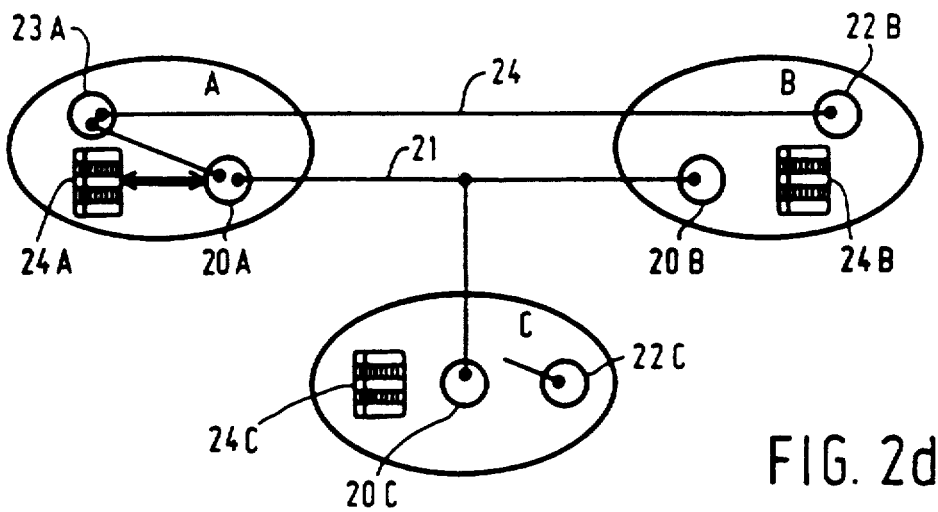

FIG. 2d illustrates the procedure when a client process 23A wishes to subcontract a task to a module having the name TASK. Process 23A asks its coordinator 20A selects, from its list 24A, server 22B having the priority number 1. A connection 24 is then established between client process 23A and server process 22B. Connection 24 is again a "logic" connection via the network 9 (FIG. 1). Server 22B then starts to perform the task.

Figure 2E:
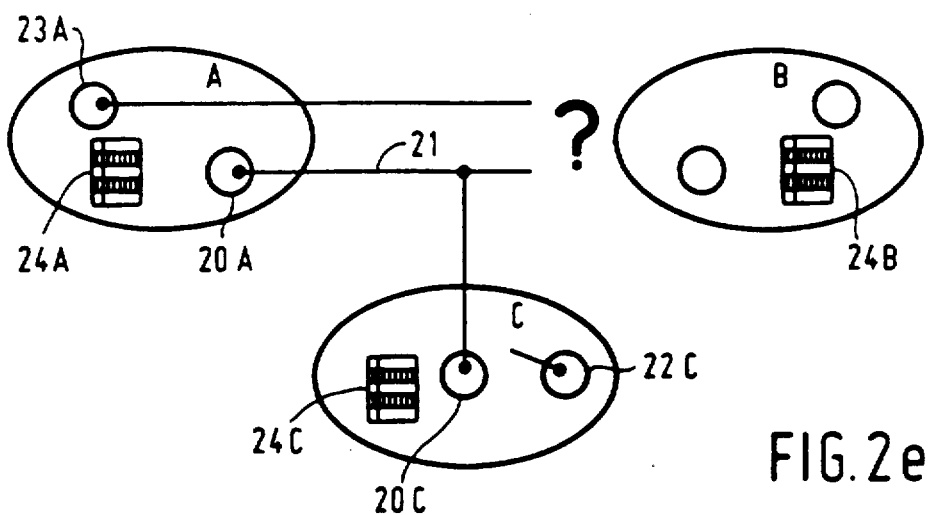

In the situation for example where the station containing server 22B breaks down as a result of a malfunction, coordinator 20B also breaks down. Consequently, reports on the degree of loading that coordinator 20B is required regularly to broadcast are absent and coordinators 20A and 20C conclude from this that station B is out of operation and change the "active" field in their "active" list into "inactive". This is represented in FIG. 2e.

Figure 2F:
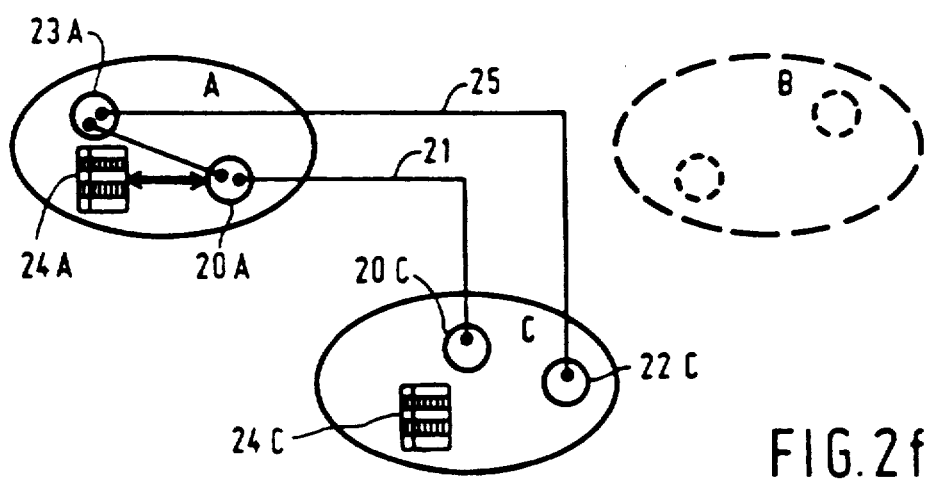

The client process 23A notes the malfunction because it no longer receives any reply from server 22B. Process 23A again asks for a connection to a TASK server and obtains connection 25 to the server having the priority number 2, 22C. This is represented in FIG. 2f. Since the task had not yet been completed, it must be completely or partially redone by If the task commanded by client process 23A has to be performed by a module of the "equivalent" category, the course of events is largely identical, but the criterion for selection of server 22 is not based on the loading data of the stations which the coordinators transmit to one another via the connection 21. Server 22 in the least loaded station is then designated.

It will be apparent to those skilled in the art that numerous other embodiments are possible within the scope of the claims, e.g. systems in which the workstations are organized in groups each coordinated by a support station. The workstations may be permanently connected to the support station of their group and the support stations be interconnected via the network.

What is claimed is:

1. An office automation system, comprising:
    intelligent units interconnected by a local network; each intelligent unit comprising a memory which stores program modules for performing specific tasks and control means; each of said control means including
    process means for executing said program modules,
    means for determining data concerning loading of the processor means,
    means for repeatedly transmitting the determined data concerning loading of the processor means and data identifying available ones of the program modules together with selection data to the other control means,
    means for receiving data concerning load of processor means and data identifying available program modules together with selection data from the other control means,
    means for maintaining in the memory data identifying all the program modules available in the system together with selection data based on the received data identifying available program modules and the received selection data and for maintaining in the memory data concerning loading of all the processor means in the system based on the received data concerning loading of processor means,
    means for designating one of said program modules in the system required to perform a specific task by reference to said data identifying all the program modules available in the system together with said selection data and to said data concerning loading of all the processor means, and
    means for establishing a connection to the intelligent unit in which resides said designated program module for executing said designated program module by the processor means of the connected intelligent unit, thereby having the specific task performed.

2. An office automation system according to claim 1, wherein said designating means designates in accordance with the selection data one of a plurality of identical program modules for specific first tasks in accordance with a predetermined priority sequence based on the selection data, and
    wherein said designating means designates one of a plurality of identical program modules for specific second tasks based on said data concerning loading of all the processor means, said designated program module residing in the intelligent unit having the least processor means loading among the intelligent units in which reside all of said identical program modules for said specific second tasks.

3. An office automation system according to claim 1 or 2, wherein the program modules, during execution upon their becoming available, inform said control means of the data identifying them together with selection data.

4. An office automation system according to claim 1 or 2, wherein when said control means has not received data from at least one of the other intelligent units for a predetermined period of time, said control means does not designate any program modules resident in said at least one other intelligent unit.

5. An office automation system according to claim 2, wherein each memory stores data required for the program modules in performing specific tasks, whereby the designated program module for a specific one of said second tasks, upon execution, maintains the data in each memory of the intelligent units in which reside program modules identical to said designated program module to keep the data required for each identical program module identical to the data required for the designated program module.

* * * * *